United States Patent
Furlong et al.

[15] 3,677,293
[45] July 18, 1972

[54] FLUID FLOW CONTROL SYSTEMS

[72] Inventors: Owen D. Furlong; Alan C. Rowe; Eric F. Wright, all of Yeovil, Somerset, England

[73] Assignee: Westland Aircraft Limited, Yeovil, Somerset, England

[22] Filed: Feb. 10, 1966

[21] Appl. No.: 526,597

[30] Foreign Application Priority Data

April 2, 1965 Great Britain......................14,078/65

[52] U.S. Cl..................................137/561, 137/81.5, 176/19
[51] Int. Cl. ..........................................................F15c 1/04
[58] Field of Search......................137/81.5, 567, 561; 165/1, 165/13; 176/19

[56] References Cited

UNITED STATES PATENTS

| | | |
|---|---|---|
| 3,171,421 | 3/1965 | Voesting..............................137/81.5 |
| 3,327,725 | 6/1967 | Hatch, Jr. ............................137/81.5 |
| 3,030,979 | 4/1962 | Reilly...................................137/81.5 |
| 3,072,147 | 1/1963 | Allen et al. ..........................137/81.5 |
| 3,159,208 | 12/1964 | Voesting.............................137/81.5 |
| 3,275,014 | 9/1966 | Plasko ................................137/81.5 |
| 3,279,531 | 10/1966 | Bowles................................137/81.5 |
| 3,292,648 | 12/1966 | Colston..............................137/81.5 |
| 3,302,935 | 2/1967 | York, Jr..............................137/81.5 |
| 3,339,571 | 9/1967 | Hatch, Jr. ...........................137/81.5 |

*Primary Examiner*—William R. Cline
*Attorney*—Larson, Taylor and Hinds

[57] ABSTRACT

A fluid flow control system for controlling conditions of flow in first and second ducts. A signal representing a condition in one duct is supplied to a fluid amplifying device, the output of which operates a control apparatus to vary the operating conditions, preferably in another fluid flow duct.

9 Claims, 2 Drawing Figures

FLUID FLOW CONTROL SYSTEMS

This invention relates to systems for the automatic control of fluid flow in ducts.

The object of the invention is to provide a fluid flow control system in which fluid amplifiers or no moving part fluid logic devices are used to reduce the number of moving parts when compared with previous pneumatic systems.

It is a further object to provide a system which is lighter in weight, needs less maintenance and takes up less space than existing flow control systems.

According to the invention, we provide a fluid flow control system, wherein a sensing means detects the varying conditions of fluid in a duct, and feeds a signal indicating said conditions directly or indirectly into one or more fluid amplifier devices, said signal being amplified and utilized to operate control means which cause the conditions of fluid in the duct to approach a predetermined level.

Figure 1:
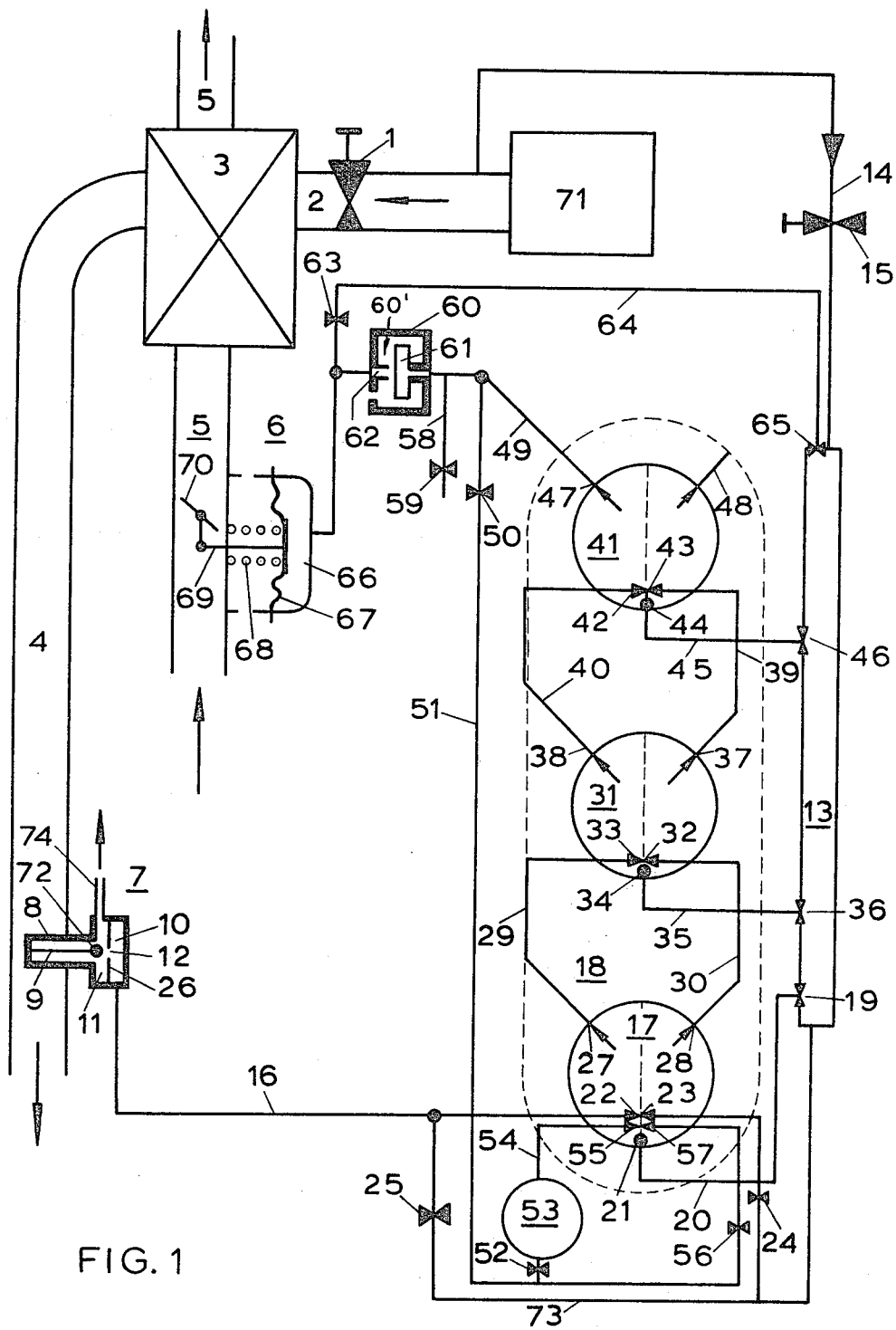
Figure 2:
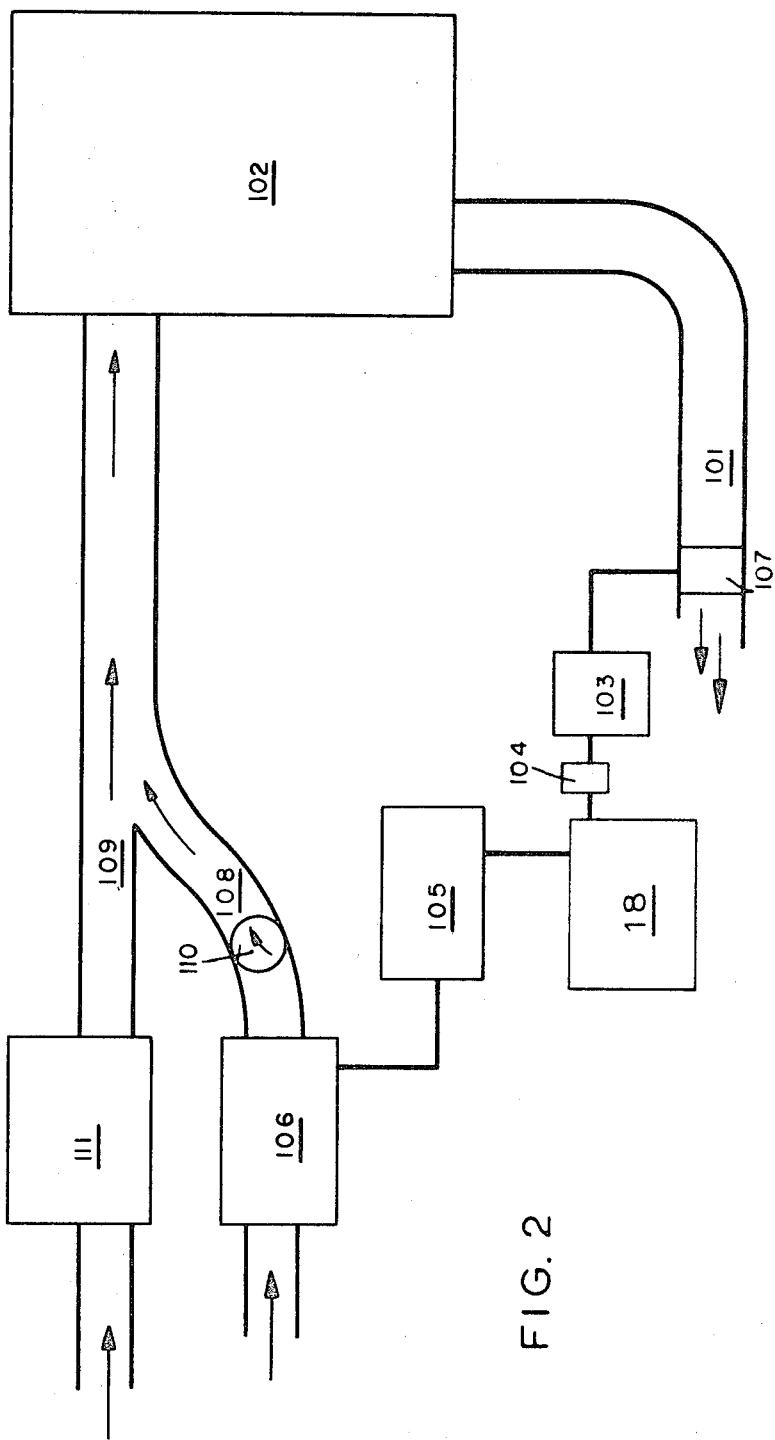

A preferred embodiment will now be described by way of example only with reference to the accompanying drawings in which FIG. 1 shows a diagrammatic representation of a system for controlling cabin temperatures in aircraft which incorporate the invention and wherein FIG. 2 shows another embodiment of the invention.

Hot air from an engine 71, is fed via a pressure reducing valve 1, through ducting 2 to a heat exchanger 3, then via ducting 4, either to the cabin or other enclosures in the aircraft requiring controlled conditions of temperature. Ram air passing through a duct 5 under the control of a butterfly valve 6 installed within the duct 5 is fed as the cooling medium into the heat exchanger 3.

The temperature of the air stream delivered from the heat exchanger 3 is sensed by a sensing means such as temperature sensor 7 downstream of the heat exchanger 3 in duct 4. This temperature sensor 7 comprises an outer housing 8 made of a material with a high coefficient of expansion, and an inner member 9, the material of which has a low expansion coefficient. The temperature sensor 7 has two chambers 10 and 11 separated by a wall 26 but interconnected by an orifice 12 in the wall 26 which allows the passage of air from supply line 16 to pass through both chambers and bleed to ambient via duct 74. The passage of air through orifice 12 is under the control of a ball valve 72 mounted on the end of the inner expansion member 9.

In operation, hot air passing through heat exchanger 3 and duct 4 heats up the outer housing 8 which expands, and draws the inner member 9 attached to the housing 8 and ball valve 72 away from the orifice 12 by the expansion differential. Accordingly, air, in relation to the temperature in duct 4, flows from line 16 through chamber 10, orifice 12 and chamber 11 to ambient. The flow or pressure variation signal developed by temperature sensor 7 in duct 16 is transmitted by a system of fluid amplifying devices to a control means such as the butterfly valve 6. The valve 6 in turn controls the supply of cold ram air through duct 5, and thereby regulates the temperature of the air passing through the heat exchanger 3.

In operation of the fluid logic devices, fluid from a source of pressure, which can be a tapping from engine 71, is fed through supply line 14 and reducing valve 15 at a constant and predetermined pressure into manifold 13. Manifold 13 supplies operating power to the fluid logic devices or amplifier elements as well as supplying a control flow to both butterfly valve 6 and temperature sensor 7.

Considering the case where the air in duct 4 from heat exchanger 3 exceeds the temperature setting of sensor 7, expansion of the outer housing 8 opens orifice 12 and allows air to escape to ambient. The immediate decrease in pressure in line 16, which supplies air to the temperature sensor 7, is felt at the first state 17 of a three-stage proportional fluid amplifier circuit, generally indicated at 18. The power for amplifier element 17 is supplied from manifold 13 through orifice 19 and supply line 20 to power nozzle 21. The supplies to control jets 22 and 23 are taken from tappings from supply line 73 through restrictive orifices 24 and 25. When orifice 12 opens and the pressure in line 16 decreases, the controlling effect from jet 22 reduces and control jet 23 diverts more of the power stream from jet 21 into receiving orifice 27 into control line 29. On reaching amplifier element 31, more of the main power stream tapped from manifold 13 via restrictive orifice 36, supply line 35, and delivered by power nozzle 34 is diverted by control jet 33 to flow through receiving orifice 37, control line 39 and on to the final stage of amplification in amplifier element 41. The flow from manifold 13 through orifice 46, line 45 and power nozzle 44 is diverted by the flow from control jet 43 to be transferred via receiving orifice 47 into channel 49.

A portion of the control flow from the final amplifier element 41 is diverted to a stabilizing or feedback circuit through a restrictive orifice 50 and control line 51. This control line is branched, one arm feeding through a restrictive orifice 56 to control jet 57 in amplifier element 17, the other arm feeding through restrictive orifice 52, capacitor 53 and control line 54 to issue from jet 55 in opposition to the jet 57 from the direct branch.

In operation, a pressure surge in control line 49 either an increase or decrease due to a change in the signal issuing from the final element 41, passes rapidly through the direct branch 51 to effect control jet 57 in element 17, but in the other branch 54 the effect is damped by the capacitor 53 to delay the pressure change affecting control jet 55.

If the pressure surge in control line 49, causing the feedback, was an increase, the flow or pressure from jet 57 will temporarily exceed that from jet 55, or if the original pressure surge was a pressure reduction, the flow or pressure in the capacitor 53, line 54 and jet 55 will exceed the pressure from jet 57 for a short time. In either case, the differential effect between the two jets 55 and 57 is in opposition to the change in signal which, issuing from main control jets 22 and 23 in element 17, initiates the signal change in the final element 41.

Fluid logic devices do not operate satisfactorily into a completely enclosed circuit or duct system, and accordingly the control line 49 from element 41 is vented to ambient through branch line 58 and restrictive orifice 59. The pressure variation exerted by the controlling flow in line 49 however, acts within a control device such as relay 60 to expand or contract capsule 61 to alter the setting of pad valve 60', and reduce the escape of air from the manifold 13 via orifice 65 supply line 64 and orifice 63 (so called because capsule 61 acts as a pad selectively covering or opening the orifice 62), through the orifice 62 of pad valve 60' to ambient. The pad valve 60' thus controls the pressure in line 64 to act directly on diaphragm 67 in butterfly valve 6. An increase of pressure in chamber 66 depresses the diaphragm 67 against spring 68 and actuates lever 69 to open valve 70.

The flow of cold ram air into the heat exchanger 3 is increased and reduces the temperature of the air flowing from the engine 1 via ducts 2 and 4 past temperature sensor 7.

A second embodiment of the invention described in FIG. 2 of the drawings is used to show the versatility of such a system, controls the radioactive waste from an atomic reactor. The sensing device 107 is a radiation detector, such as a scintillator and a photo-multiplier installed within the sea-water outlet 101 of the reactor 102. This detector is preset, so that when the level of radiation in the waste coolant discharged from the reactor exceeds a safe limit, a demodulated signal from the detector 105 is fed via a linear actuator 103 to a pad valve 104. The signal developed by the operation of this pad valve is presented as a control system to the first stage of a proportional fluid amplifier 18 as described in the previous embodiment. The amplified signal is fed to a further linear actuator 105 which operates auxiliary pump 106 in branch 108 of the sea-water inlet 109 of the reactor 102. This second pump 106 through non-return valve 110 in 108 adds its volume of water to that supplied through branch 109 by main pump 111 delivering more water into the reactor 102 allowing the waste to be dispelled in a greater volume.

It will be obvious to those skilled in the art that certain modifications can be made to the system as described without departing from the scope of the invention. For example, in carrying the invention into effect, the sensor in the duct may be a flow sensor, for example, of the orifice plate pitot static, duct venturi or sampling venturi types. The signal output from the required sensor may feed either directly or by way of a mechanical, electrical or pneumatic device into any type of fluid amplifier of the kind without moving parts, such as a beam deflection or boundary layer amplifier of the elbow double leg, direct impact, modulator induction, turbulence, focused jet types or vortex type, or a combination of more than one type of fluid amplifier device in progressive stages of amplification.

It is also obvious that the systems as described are only given in outline form to show the principle and operation of the invention, and that in practice more complex systems of heat exchange or flow control could be employed.

We claim as our invention:

1. A fluid flow control system for controlling conditions of flow in a first fluid flow duct in response to conditions existing in a second fluid flow duct, the two ducts being related such that conditions in the first fluid flow duct, in turn affect conditions in the second fluid flow duct, comprising a sensing means positioned for sensing a condition in the second fluid flow duct and supplying a signal representative of said condition, a fluid flow amplifying device including at least one amplifying stage having a power nozzle and first and second opposing control nozzles, power source means for supplying pressurized fluid through fluid passages to said power nozzle and also to said control nozzles, said amplifying device also including an output passage, the said fluid flow passages of the said fluid amplifying device forming a separate fluid flow system free from fluid communication with said first duct, means for varying the pressure at one of the control nozzles of the said pressurized fluid supplied from the power source in response to said signal, means for conveying said signal to said pressure varying means, a control means for changing the conditions in the first fluid flow duct and hence also indirectly changing the conditions in the second fluid flow duct and a control device connected to and operable in response to the change in pressure in the said output passage of the amplifying device operatively connected to the control means.

2. A fluid flow control device as claimed in claim 1 including a power source means for supplying pressurized fluid to operate the control means, and wherein said control device is a bleed valve for controlling the pressure in the fluid line between the power source means and the control means, and wherein the output of the amplifying device determines the opening of said bleed valve.

3. A fluid flow control system as claimed in claim 2 wherein said fluid amplifying devices and said control means are supplied with pressurized fluid derived from a common source.

4. A fluid flow control system as claimed in claim 1 wherein said first and second ducts are first and second cooperating ducts in heat conducting relationship with each other in a heat exchanger, the first duct being the temperature control duct and the second duct being main fluid flow duct, said sensing means comprising a device for sensing the temperature in the main fluid flow duct and said control means being a valve device for regulating the flow of fluid through the temperature control duct into the heat exchanger.

5. A fluid flow control system as claimed in claim 4 including a power source means for supplying pressurized fluid to operate the control means, and wherein said control device is a bleed valve for controlling the pressure in the fluid line between the power source means and the valve actuator device and wherein the said output of the amplifying device determines the opening of said bleed valve.

6. A fluid flow control system as claimed in claim 5 wherein said sensing means is a differential expansion thermal sensor.

7. A fluid flow control system as claimed in claim 1 wherein said first and second ducts are fluid inlet and outlet ducts, respectively, for circulating fluid through a radioactive device, said sensing means comprises a means for detecting the level of radiation in the outlet duct, and wherein the control means is operable to regulate the flow of fluid in said inlet duct.

8. A fluid flow control system in claim 7 including a first linear actuator operable in response to said radiation detector for constituting the said means for operating one of said control nozzles, and including a second linear actuator operable in response to the output of the amplifying device for operating said control means.

9. A fluid flow control system as claimed in claim 8 wherein said control means comprises a pump operated in response to the second linear actuator for pumping fluid into said inlet duct.

* * * * *